US012673726B2

(12) United States Patent
Kuehner et al.

(10) Patent No.: US 12,673,726 B2
(45) Date of Patent: Jul. 7, 2026

(54) GUIDING AN INDIVIDUAL TO CAUSE A VEHICLE TO MAKE A TURN CORRECTLY

(71) Applicant: Woven by Toyota, Inc., Tokyo (JP)

(72) Inventors: Manuel Ludwig Kuehner, Mountain View, CA (US); Hiroshi Yasuda, San Francisco, CA (US)

(73) Assignee: Woven by Toyota, Inc., Tokyo (JP)

( * ) Notice: Subject to any disclaimer, the term of this patent is extended or adjusted under 35 U.S.C. 154(b) by 410 days.

(21) Appl. No.: 18/072,074

(22) Filed: Nov. 30, 2022

(65) Prior Publication Data

US 2024/0174289 A1    May 30, 2024

(51) Int. Cl.
B62D 15/02        (2006.01)
B62D 6/00        (2006.01)

(52) U.S. Cl.
CPC ........... B62D 15/025 (2013.01); B62D 6/008 (2013.01)

(58) Field of Classification Search
CPC ...... B62D 15/025; B62D 6/008; B62D 6/007; B62D 1/02
See application file for complete search history.

(56) References Cited

U.S. PATENT DOCUMENTS 9,889,876 B2    2/2018    Russell et al.
2005/0143889 A1*    6/2005    Isaji ........................ G08G 1/161
                                                            701/80
2008/0198372 A1    8/2008    Pan 2010/0280713 A1*    11/2010    Stahlin .................. B60W 50/16
                                                            701/1
2013/0238192 A1*    9/2013    Breu ..................... B62D 15/029
                                                            701/41
2014/0067259 A1*    3/2014    Walsh .................... G06Q 50/26
                                                            701/437

(Continued)

FOREIGN PATENT DOCUMENTS

CN        106062852 A        10/2016

OTHER PUBLICATIONS

Tran et al., "A Left-Turn Driving Aid Using Projected Oncoming Vehicle Paths with Augmented Reality," Proceedings of the 5th International Conference on Automotive User Interfaces and Interactive Vehicular Applications, 2013, pp. 300-307.

(Continued)

*Primary Examiner* — Abby J Flynn
*Assistant Examiner* — Paulo Roberto Gonzalez Leite
(74) *Attorney, Agent, or Firm* — Christopher G. Darrow; Darrow Mustafa PC

(57)        ABSTRACT

A system for guiding an individual to cause a vehicle to make a turn correctly can include a processor and a memory. The memory can store a communications module and an actuation module. The communications module can cause the processor to obtain information about a specific side of a road on which the vehicle is to be operated. The communications module can cause the processor to obtain information about a degree of familiarity of the individual in operating the vehicle on the specific side. The actuation module can cause the processor to cause, in response to the degree of familiarity being less than a threshold, a possible change to a normal operation of a steering operator interface of the vehicle, in response to a receipt of an input from the individual, to guide the individual to cause the vehicle to make the turn correctly.

21 Claims, 6 Drawing Sheets

(56) References Cited

U.S. PATENT DOCUMENTS

| | | | | |
|---|---|---|---|---|
| 2014/0225749 | A1* | 8/2014 | Saka | G08G 1/093 340/905 |
| 2017/0341580 | A1 | 11/2017 | Okuda et al. | |
| 2019/0376798 | A1 | 12/2019 | Abramson | |
| 2020/0001875 | A1 | 1/2020 | Kato et al. | |
| 2021/0153796 | A1 | 5/2021 | De Weser et al. | |
| 2021/0155242 | A1 | 5/2021 | Taniguchi | |
| 2021/0192975 | A1 | 6/2021 | Spence et al. | |
| 2021/0264778 | A1* | 8/2021 | McFarland, Jr. | B60W 30/09 |
| 2022/0306145 | A1 | 9/2022 | Komikawa et al. | |
| 2023/0311984 | A1* | 10/2023 | Iwama | B62D 15/025 |
| 2024/0034320 | A1* | 2/2024 | Hidaka | B60W 30/18159 |

OTHER PUBLICATIONS

Cheng et al., "An Application of Augmented Reality Head-Up Display," Automotive Research & Testing Center, vol. 6, pp. 1-9.
Unknown, "Spatial light modulator," last accessed on Jul. 19, 2022, 3 pages, found at https://en.wikipedia.org/wiki/Spatial_light_modulator.
Unknown, "Digital Light: Millions of Pixels on the Road," Jun. 20, 2022, 8 pages, found at https://www.al.world/news/article/digital-light-millions-of-pixels-on-the-road/.
Andrew Krok, "Mercedes' wild new headlights project an HD image onto the road," CNET, Dec. 2, 2016, 3 bages.
Collin Woodard, "New Maybach Headlights can Project Images on the Road," Motortrend, Mar. 5, 2018, 5 pages.
Unknown, "Head-up display," last accessed on Nov. 27, 2022, 14 pages, found at https://en.wikipedia.org/wiki/Head-up_display.
Whitney Russell, "How Do Head-Up Displays Work?" The News Wheel, Jun. 30, 2021, 4 pages, found at https://thenewswheel.com/how-do-head-up-displays-work/8254473980_7673f0f37a_k/.
Unknown, "How does head-up display work?" Mar. 13, 2018, 7 pages, found at https://www.hyundai.news/eu/articles/stories/how-does-head-up-display-work.html##:~:text=A.
Unknown, "Understanding the Heads-Up Display," Mar. 9, 2021, 4 pages, found at https://www.trueblueautoglass.com/how-does-a-heads-up-display-work/.
Unknown, "What Are Holographic Head Up Displays," MAT Europe, last accessed on Dec. 23, 2022, 6 pages, found at https://www.matfoundrygroup.com/blog/What_Are_Holographic_Head_Up_Displays.
Blake Z. Rong, "What is HUD?" Nov. 22, 2016, 7 pages, found at https://www.roadandtrack.com/about/a31240/how-does-a-heads-up-display-work/.
Non-Final Office Action for U.S. Appl. No. 18/097,584 mailed on Jun. 10, 2024, 14 pages.
Song et al. "Enhancing GPS with Lane-level Navigation to Facilitate Highway Driving," IEEE Transactions on Vehicular Technology, vol. 66, No. 6, Jun. 2017, pp. 4579-4591.
Kim et al. "Development of an Active Front Steering System," International Journal of Automotive Technology, vol. 7, No. 3, 2006, pp. 315-320.
Thompson et al. "Allocation of attention in familiar and unfamiliar traffic scenarios," vol. 55, May 2018, pp. 188-198.
Liono et al. "Detecting passenger discomfort from abnormal driving manoeuvres," 23rd ITS World Congress, Melbourne, Australia, Oct. 2016, pp. 1-12, 10-14.
Wynne et al. "You look familiar: Learner driver hazard identification on familiar and unfamiliar roads," Proceedings of the Human Factors and Ergonomics Society Annual Meeting, vol. 63, 2019, pp. 2001-2005.
Naqvi et al. "Deep Learning-Based Gaze Detection System for Automobile Drivers Using a NIR Camera Sensor," Sensors, vol. 18, No. 2, 2018, pp. 456-489.
Geng et al., "ANFTS Mode Control for an Electronically Controlled Hydraulic Power Steering System on a Permanent Magnet Slip Clutch," Energies, vol. 12, No. 9, pp. 1739-1760, 2019.
Mia Bevacqua, "How Does Power Steering Work? (With Example Diagrams)" 7 pages, last accessed on Nov. 29, 2022, found at https://www.carparts.com/blog/how-does-power-steering-work-with-example-diagrams/.
Andrew Markel, "Variable Ratio Steering Systems," Jun. 29, 2020, 3 pages, found at https://www.tomorrowstechnician.com/variable-ratio-steering-systems/.
Unknown, "Active steering," 3 pages, last accessed on Jan. 31, 2022, found at https://en.wikipedia.org/wiki/Active_steering.
Unknown, "Drive by wire," 4 pages, last accessed on Jan. 17, 2022, found at https://en.wikipedia.org/wiki/Drive_by_wire.
Unknown, "Power steering," 7 pages, last accessed on Sep. 29, 2022, found at https://en.wikipedia.org/wiki/Power_steering.
Unknown, "Steering ratio," 2 pages, last accessed on Nov. 2, 2022, found at https://en.wikipedia.org/wiki/Steering_ratio.

* cited by examiner

400

Start

Obtain Information Indicative of an Acknowledgement, by an Individual Who Is, Has, or Will Be Operating a Vehicle, that the Method Includes Causing a Possible Change to a Normal Operation of a Steering Operator Interface        408

Obtain Information about a Specific Side of a Road on which the Vehicle is to be Operated        402

Obtain Information about a Degree of Familiarity of the Individual in Operating the Vehicle on the Specific Side        404

—410

Define, in Response to a Receipt of Information Indicative that a Probability that the Vehicle is About to Make a Turn is Greater than a Probability Threshold, a First Time as a Time at which to Commence the Possible Change to the Steering Operator Interface Obtaining Information about an Existence of a Condition in which a Probability that the Possible Change to the Normal Operation of the Steering Operator Interface will be Detrimental to an Operation of the Vehicle is Greater than a Probability Threshold        416

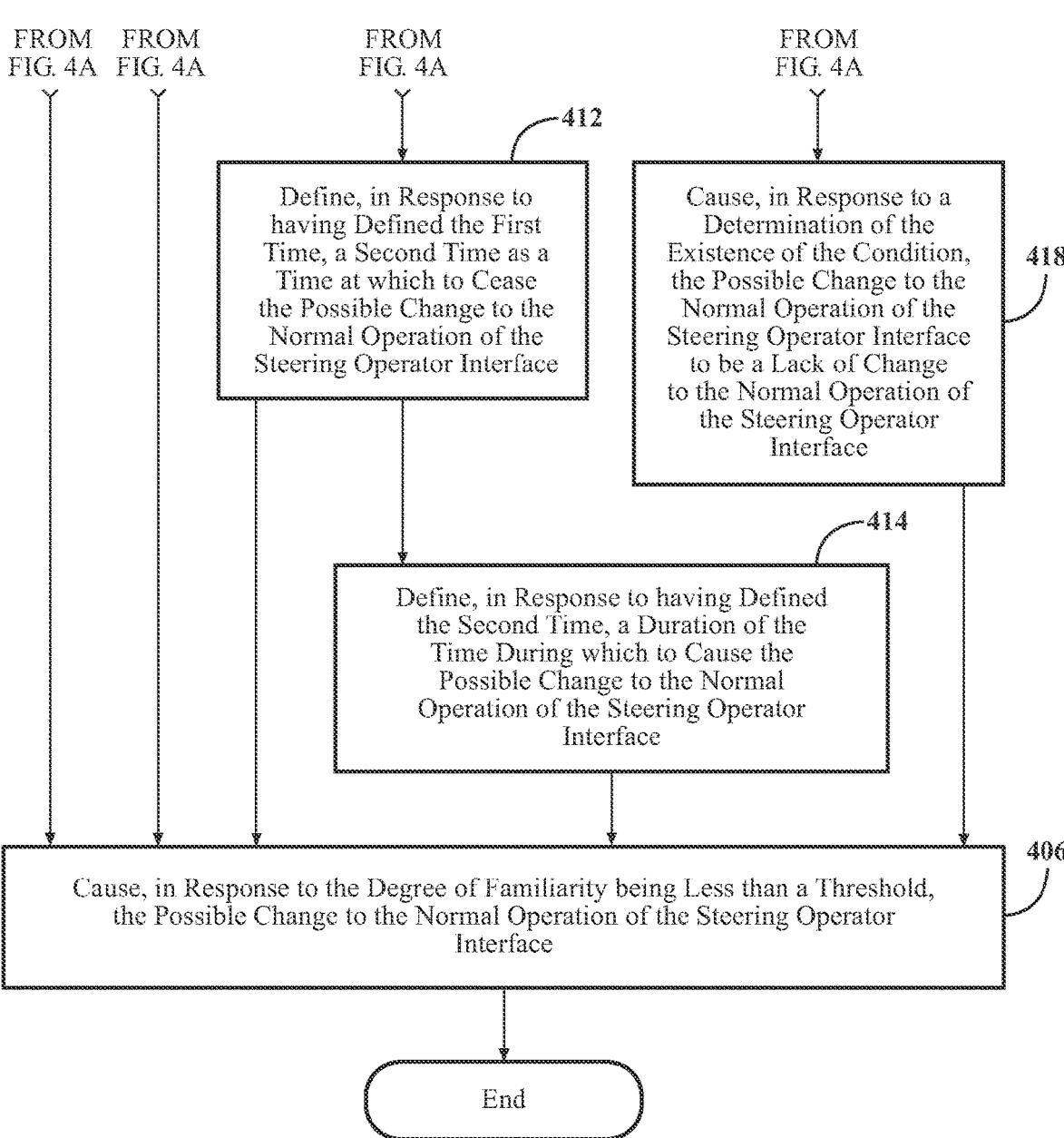

400

FROM          FROM                    FROM                                                    FROM
FIG. 4A       FIG. 4A                 FIG. 4A                                                 FIG. 4A

412

Define, in Response to
having Defined the First
Time, a Second Time as a
Time at which to Cease
the Possible Change to the
Normal Operation of the
Steering Operator Interface Cause, in Response to a
Determination of the
Existence of the Condition,
the Possible Change to the          418
Normal Operation of the
Steering Operator Interface
to be a Lack of Change
to the Normal Operation of
the Steering Operator
Interface

414

Define, in Response to having Defined
the Second Time, a Duration of the
Time During which to Cause the
Possible Change to the Normal
Operation of the Steering Operator
Interface

406

Cause, in Response to the Degree of Familiarity being Less than a Threshold,
the Possible Change to the Normal Operation of the Steering Operator
Interface End

FIG. 4B

GUIDING AN INDIVIDUAL TO CAUSE A VEHICLE TO MAKE A TURN CORRECTLY

TECHNICAL FIELD

The disclosed technologies are directed to guiding an individual to cause a vehicle to make a turn correctly.

BACKGROUND

Regulations that govern travel on many roads can provide that movement of vehicles, pedestrians, and other conveyances along such roads be confined to two streams of traffic that flow in opposite directions. Such traffic can be referred to as bidirectional traffic. Such regulations can dictate a specific side of a road (e.g., either left or right) to which traffic is to adhere. Such regulations can be promulgated by regimes (e.g., countries). For historic and other reasons, specific regimes can have selected one side of the road (e.g., left (right)) as the specific side of the road to which traffic is to adhere. Traffic in regimes that have selected the left side of the road as the specific side of the road to which traffic is to adhere can be referred to as left-hand traffic. Likewise, traffic in regimes that have selected the right side of the road as the specific side of the road to which traffic is to adhere can be referred to as right-hand traffic. An individual that regularly operates a vehicle in a right-hand (left-hand) traffic regime may have a high degree of familiarity in operating the vehicle on the right (left) side of the road. However, if this individual has spent little time operating a vehicle in a left-hand (right-hand) traffic regime, this individual may have a low degree of familiarity in operating the vehicle on the left (right) side of the road. Such a low degree of familiarity can be particularly problematic at a time at which this individual is operating the vehicle at an intersection with an intent to cause the vehicle to make a turn from a first road to a second road.

SUMMARY

In an embodiment, a system for guiding an individual to cause a vehicle to make a turn correctly can include a processor and a memory. The memory can store a communications module and an actuation module. The communications module can include instructions that, when executed by the processor, cause the processor to obtain information about a specific side of a road on which the vehicle is to be operated. The communications module can include instructions that, when executed by the processor, cause the processor to obtain information about a degree of familiarity of the individual in operating the vehicle on the specific side. The actuation module can include instructions that, when executed by the processor, cause the processor to cause, in response to the degree of familiarity being less than a threshold, a possible change to a normal operation of a steering operator interface of the vehicle, in response to a receipt of an input from the individual, to guide the individual to cause the vehicle to make the turn correctly.

In another embodiment, a method for guiding an individual to cause a vehicle to make a turn correctly can include obtaining, by a processor, information about a specific side of a road on which the vehicle is to be operated. The method can include obtaining, by the processor, information about a degree of familiarity of the individual in operating the vehicle on the specific side. The method can include causing, by the processor and in response to the degree of familiarity being less than a threshold, a possible change to a normal operation of a steering operator interface of the vehicle, in response to a receipt of an input from the individual, to guide the individual to cause the vehicle to make the turn correctly.

In another embodiment, a non-transitory computer-readable medium for guiding an individual to cause a vehicle to make a turn correctly can include instructions that, when executed by one or more processors, cause the one or more processors to obtain information about a specific side of a road on which the vehicle is to be operated. The non-transitory computer-readable medium can also include instructions that, when executed by one or more processors, cause the one or more processors to obtain, information about a degree of familiarity of the individual in operating the vehicle on the specific side. The non-transitory computer-readable medium can also include instructions that, when executed by one or more processors, cause the one or more processors to cause, in response to the degree of familiarity being less than a threshold, a possible change to a normal operation of a steering operator interface of the vehicle, in response to a receipt of an input from the individual, to guide the individual to cause the vehicle to make the turn correctly.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 4A and 4B include a flow diagram that illustrates an example of a method that is associated with guiding an individual to cause a vehicle to make a turn correctly, according to the disclosed technologies.

DETAILED DESCRIPTION

Figure 1:
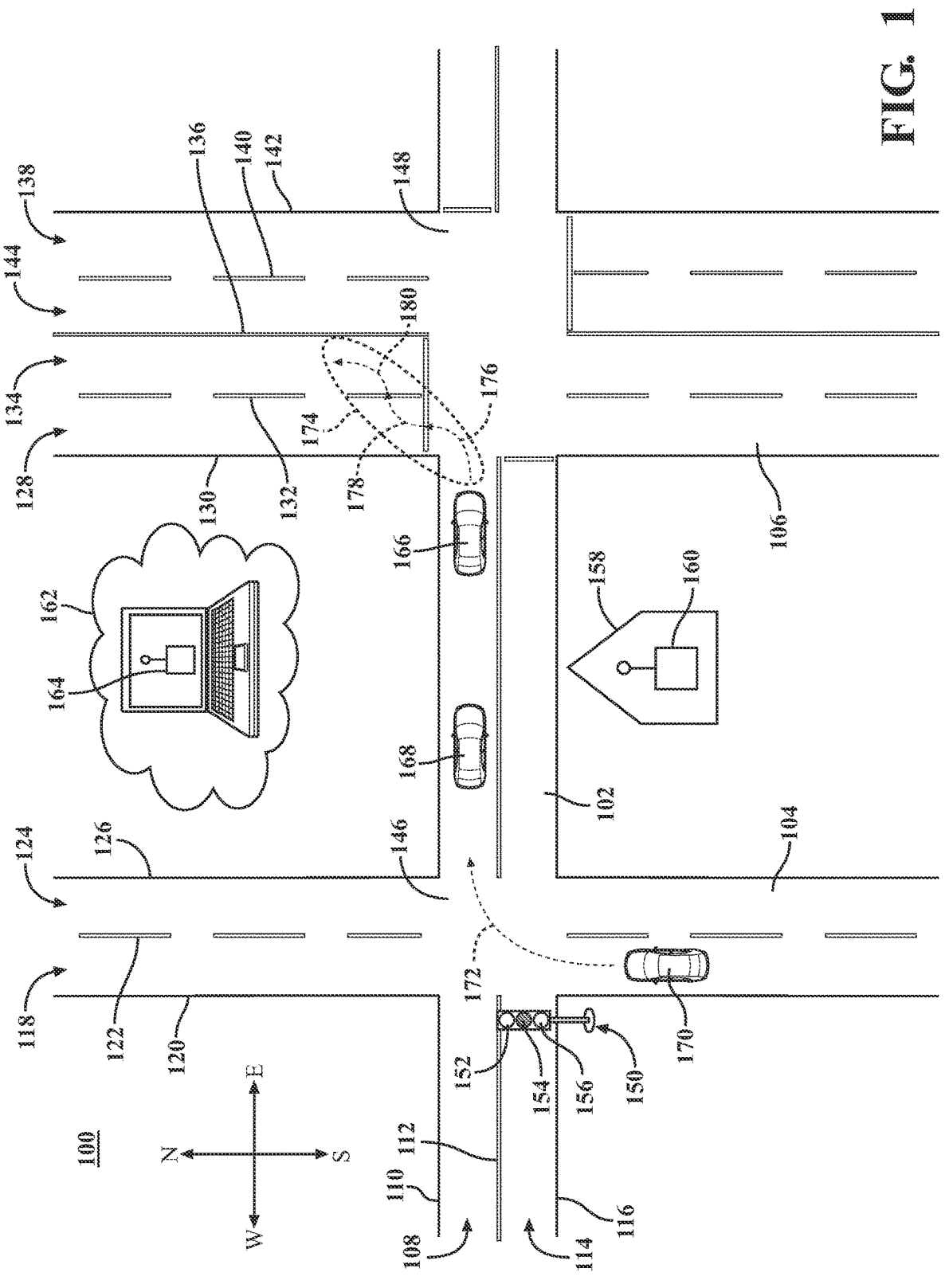
FIG. 1 includes a diagram that illustrates an example of an environment for guiding an individual to cause a vehicle to make a turn correctly, according to the disclosed technologies.

The disclosed technologies are directed to guiding an individual to cause a vehicle to make a turn correctly. Information about a specific side (e.g., left (right)) of a road on which the vehicle is to be operated can be obtained. Information about a degree of familiarity of the individual in operating the vehicle on the specific side (e.g., left (right)) can be obtained. In response to the degree of familiarity being less than a threshold, a possible change to a normal operation of a steering operator interface of the vehicle can be caused to guide the individual to cause the vehicle to make a turn correctly. For example, the steering operator interface can include a steering wheel, a handlebar, a twin lever steering interface, a joystick-like control lever, or the like. For example, the possible change to the normal operation of the steering operator interface can be an actual change to the normal operation of the steering operator interface.

In an implementation, the possible change to the normal operation of the steering operator interface can include a change to a steering torque feedback. A steering torque feedback can be produced by contact between a tire of the vehicle and a surface of the road, conveyed through one or more mechanisms of the steering operator interface, and perceived by the individual operating the vehicle. For example, a power assist steering mechanism can be connected to the steering operator interface and can act to add to or subtract from torque conveyed through the one or more mechanisms of the steering operator interface to assist the individual in operating the steering operator interface. For example, the power assist steering mechanism can be an electric power assist steering mechanism. For example, in response to the degree of familiarity of the individual in operating the vehicle on the specific side (e.g., left (right)) being less than the threshold, the change to the steering torque feedback can be an increase of the steering torque feedback when a direction of the turn is opposite of the specific side (e.g., right (left)). Such an increase of the steering torque feedback can cause the individual operating the steering operator interface to need to apply a greater degree of torque to the steering operator interface in order to cause the vehicle to make the turn in the direction (e.g., right (left)), which can reduce a likelihood that the individual will oversteer the vehicle into oncoming traffic. Additionally or alternatively, for example, in response to the degree of familiarity of the individual in operating the vehicle on the specific side (e.g., left (right)) being less than the threshold, the change to the steering torque feedback can be a decrease of the steering torque feedback when the direction of the turn is identical to the specific side (e.g., left (right)). Such a decrease of the steering torque feedback can cause the individual operating the steering operator interface to need to apply a lesser degree of torque to the steering operator interface in order to cause the vehicle to make the turn in the direction (e.g., left (right)), which can reduce a likelihood that the individual will understeer the vehicle into oncoming traffic.

Additionally or alternatively, in another implementation, the possible change to the normal operation of the steering operator interface can include a change to a steering ratio. A steering ratio can be a ratio between a measure of a change of a position of the steering operator interface and a measure of a degree of a rotation of a wheel of the vehicle. The wheel can be a wheel used to cause the turn. For example, the measure of the change of the position of the steering operator interface can include a measure of a degree of rotation of the steering operator interface.

For example, such a change to the steering ratio can be produced by a variable-ratio steering mechanism, an adaptive steering mechanism, an active steering mechanism, or the like. For example, in response to the degree of familiarity of the individual in operating the vehicle on the specific side (e.g., left (right)) being less than the threshold, the change to the steering ratio can be a decrease of the steering ratio when a direction of the turn is opposite of the specific side (e.g., right (left)). Such a decrease of the steering ratio can cause the individual operating the steering operator interface to need to change the position of the steering operator interface by a greater degree in order to cause the vehicle to make the turn in the direction (e.g., right (left)), which can reduce a likelihood that the individual will oversteer the vehicle into oncoming traffic. Additionally or alternatively, for example, in response to the degree of familiarity of the individual in operating the vehicle on the specific side (e.g., left (right)) being less than the threshold, the change to the steering ratio can be an increase of the steering ratio when the direction of the turn is identical to the specific side (e.g., left (right)). Such an increase of the steering ratio can cause the individual operating the steering operator interface to need to change the position of the steering operator interface by a lesser degree in order to cause the vehicle to make the turn in the direction (e.g., left (right)), which can reduce a likelihood that the individual will understeer the vehicle into oncoming traffic.

FIG. 1 includes a diagram that illustrates an example of an environment 100 for guiding an individual to cause a vehicle to make a turn correctly, according to the disclosed technologies. For example, the environment 100 can be within the United Kingdom, a regime with left-hand traffic. The environment 100 can include Buckingham Street 102 (disposed along a line of latitude), Anglo Avenue 104 (disposed along a line of longitude), and Saxon Boulevard 106 (disposed along a line of longitude, east of Anglo Avenue 104).

For example, Buckingham Street 102 can include a lane #1 108 (for eastbound traffic). For example, the lane #1 108 can be bounded on the north by a lane marking 110. Lane marking 110 can be a type of lane marking that indicates an edge of a road. For example, the lane #1 108 can be bounded on the south by a lane marking 112. Lane marking 112 can be a type of lane marking that indicates a separation between lanes in which streams of traffic flow in opposite directions. For example, Buckingham Street 102 can include a lane #1 114 (for westbound traffic). For example, the lane #1 114 can be bounded on the north by the lane marking 112. For example, the lane #1 114 can be bounded on the south by a lane marking 116. Lane marking 116 can be the type of lane marking that indicates an edge of a road.

For example, Anglo Avenue 104 can include a lane #1 118 (for northbound traffic). For example, the lane #1 118 can be bounded on the west by a lane marking 120. Lane marking 120 can be the type of lane marking that indicates an edge of a road. For example, the lane #1 118 can be bounded on the east by a lane marking 122. Lane marking 122 can be the type of lane marking that indicates a separation between lanes in which streams of traffic flow in opposite directions. For example, Anglo Avenue 104 can include a lane #1 124 (for southbound traffic). For example, the lane #1 124 can be bounded on the west by the lane marking 122. For example, the lane #1 124 can be bounded on the east by a lane marking 126. Lane marking 126 can be the type of lane marking that indicates an edge of a road.

For example, Saxon Boulevard 106 can include a lane #1 128 (for northbound traffic). For example, the lane #1 128 can be bounded on the west by a lane marking 130. Lane marking 130 can be the type of lane marking that indicates an edge of a road. For example, the lane #1 128 can be bounded on the east by a lane marking 132. Lane marking 132 can be a type of lane marking that indicates a separation between lanes in which streams of traffic flow in identical directions. For example, Saxon Boulevard 106 can include a lane #2 134 (for northbound traffic). For example, the lane #1 134 can be bounded on the west by the lane marking 132. For example, the lane #2 134 can be bounded on the east by

5 a lane marking 136. Lane marking 136 can be the type of lane marking that indicates a separation between lanes in which streams of traffic flow in opposite directions. For example, Saxon Boulevard 106 can include a lane #1 138 (for southbound traffic). For example, the lane #1 138 can be bounded on the west by a lane marking 140. Lane marking 140 can be the type of lane marking that indicates a separation between lanes in which streams of traffic flow in identical directions. For example, the lane #1 138 can be bounded on the cast by a lane marking 142. Lane marking 142 can be the type of lane marking that indicates an edge of a road. For example, Saxon Boulevard 106 can include a lane #2 144 (for southbound traffic). For example, the lane #2 144 can be bounded on the west by the lane marking 136. For example, the lane #2 144 can be bounded on the cast by the lane marking 140.

For example, a first intersection 146 can be formed by Buckingham Street 102 and Anglo Avenue 104. For example, a second intersection 148 can be formed by Buckingham Street 102 and Saxon Boulevard 106.

For example, the environment 100 can include, at a southwest corner of the first intersection 146, a traffic light 150. The traffic light 150 can be for northbound traffic on Anglo Avenue 104. For example, the traffic light 150 can include a first light 152, a second light 154, and a third light 156. For example, the first light 152 can have a color associated with a message that a vehicle is to stop (e.g., red). For example, the second light 154 can have a color associated with a message that the vehicle is to proceed with caution in anticipation of the traffic light 150 causing the first light 152 to be illuminated (e.g., yellow). For example, the third light 156 can have a color associated with a message that the vehicle may proceed (e.g., green).

For example, the environment 100 can include a building 158. For example, a communications device 160 can be located within the building 158.

For example, the environment 100 can include a cloud computing platform 162. For example, the cloud computing platform 162 can include a communications device 164.

For example, the environment 100 can include a first vehicle 166, a second vehicle 168, and a third vehicle 170. For example, the first vehicle 166 can be located in the lane #1 108 about five meters west of the second intersection 148. For example, the second vehicle 168 can be located in the lane #1 108 between the first intersection 146 and the second intersection 148. For example, the third vehicle 170 can be located in the lane #1 118 about fifteen meters south of the first intersection 146.

For example, the environment 100 can be associated with an event in which Audrey, Brigitte, and Dorit are visiting the United Kingdom to attend the wedding of their friend, Charlotte. Audrey is from the United States, a regime with right-hand traffic, and this is her first visit to a regime with left-hand traffic. Audrey believes that she has a low degree of familiarity in operating a vehicle in a regime with left-hand traffic. Audrey is operating the first vehicle 166. Brigitte is from France, a regime with right-hand traffic, and she frequently visits the United Kingdom. Brigitte believes that she has a high degree of familiarity in operating a vehicle in a regime with left-hand traffic. Brigitte is operating the second vehicle 168. Dorit is from Germany, a regime with right-hand traffic, and she has visited the United Kingdom twice before this event. Dorit believes that she has a reasonable degree of familiarity in operating a vehicle in a regime with left-hand traffic. Dorit is operating the third vehicle 170.

6

Figure 2:
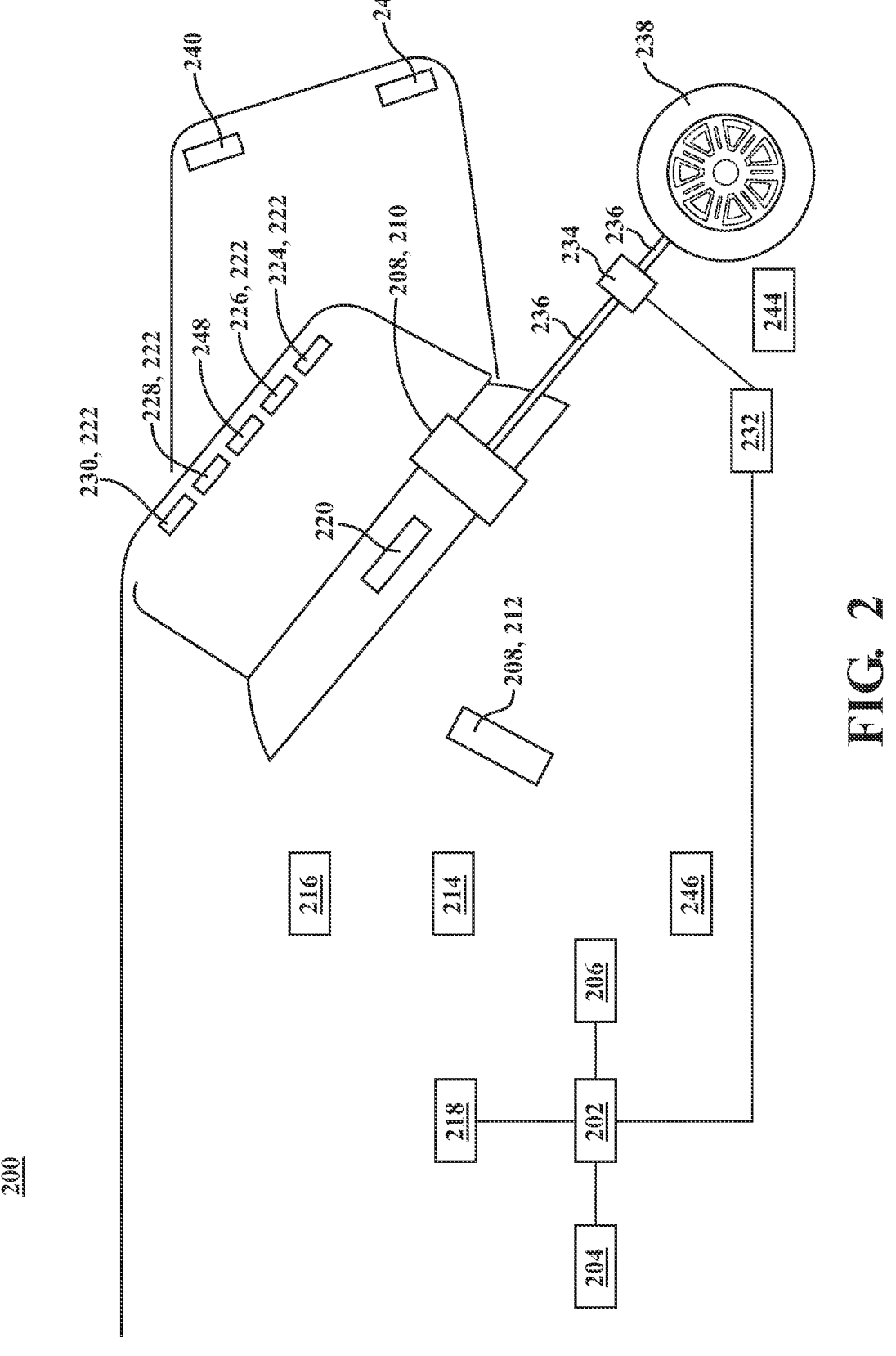
FIG. 2 includes a diagram that illustrates an example of a vehicle in which an individual can be guided to cause the vehicle to make a turn correctly, according to the disclosed technologies.

FIG. 2 includes a diagram that illustrates an example of a vehicle 200 in which an individual can be guided to cause the vehicle 200 to make a turn correctly, according to the disclosed technologies. For example, one or more of the first vehicle 166, the second vehicle 168, or the third vehicle 170 illustrated in FIG. 1 can be the vehicle 200. The vehicle 200 can include, for example, a processor 202, a memory 204, and a communications device 206. The memory 204 can be communicably coupled to the processor 202. The communications device 206 can be communicably coupled to the processor 202.

Additionally, for example, the vehicle 200 can include a steering operator interface 208. In a first example 210, the steering operator interface 208 can be a steering wheel, a handlebar, a twin lever steering interface, or the like. In a second example 212, the steering operator interface 208 can be a joystick-like control lever or the like.

Additionally, for example, the vehicle 200 can include a sensor 214 configured to determine a current location of the vehicle 200. For example, the sensor 214 can be a Global Navigation Satellite System (GNSS) sensor.

Additionally, for example, the vehicle 200 can include a sensor 216 configured to detect a lane marking that indicates a side of a road at which the vehicle 200 is located. For example, the sensor 216 can be a side-facing camera.

Additionally, for example, the vehicle 200 can include a data store 218. The data store 218 can be communicably coupled to the processor 202. For example, the data store 218 can store data indicative of a side (e.g., left or right) of the vehicle 200 at which the steering operator interface 208 is disposed.

Additionally, for example, the vehicle 200 can include a user interface 220. For example, the user interface 220 can be configured to receive information from an individual who is, has, or will be operating the vehicle 200.

Additionally, for example, the vehicle 200 can include a sensor 222 configured to obtain information indicative of a cognitive state of an individual operating the vehicle 200. For example, the sensor 222 can be one or more of a gaze-tracking system 224, a still image camera 226, a video camera 228, an infrared camera 230, or the like.

Additionally, for example, the vehicle 200 can include a controller 232 and an actuator 234. The controller 232 can be communicably coupled to the processor 202. For example, the controller 232 can be configured to receive a first signal and to send, in response to a receipt of the first signal a second signal to the actuator 234. The actuator 234 can be coupled to a steering mechanism 236. The steering mechanism 236 can be coupled between the steering operator interface 208 and one or more wheels 238 of the vehicle 200. For example, one or more of the controller 232 or the actuator 234 can be associated with one or more of a power assist steering mechanism, an electric power assist steering system, a variable-ratio steering mechanism, an adaptive steering mechanism, an active steering mechanism, a steering effort control module, or the like. Additionally, for example, the actuator 234 can be associated with one or more of a motor, a worm gear, a toothed gear, or the like.

Additionally, for example, the vehicle 200 can include a left turn signal device 240 and a right turn signal device 242.

Additionally, for example, the vehicle 200 can include a speedometer 244.

Additionally, for example, the vehicle 200 can include a timer 246.

Additionally, for example, the vehicle 200 can include a sensor 248 configured to detect an image of a traffic light. For example, the sensor 248 can be a forward-facing camera.

Figure 3:
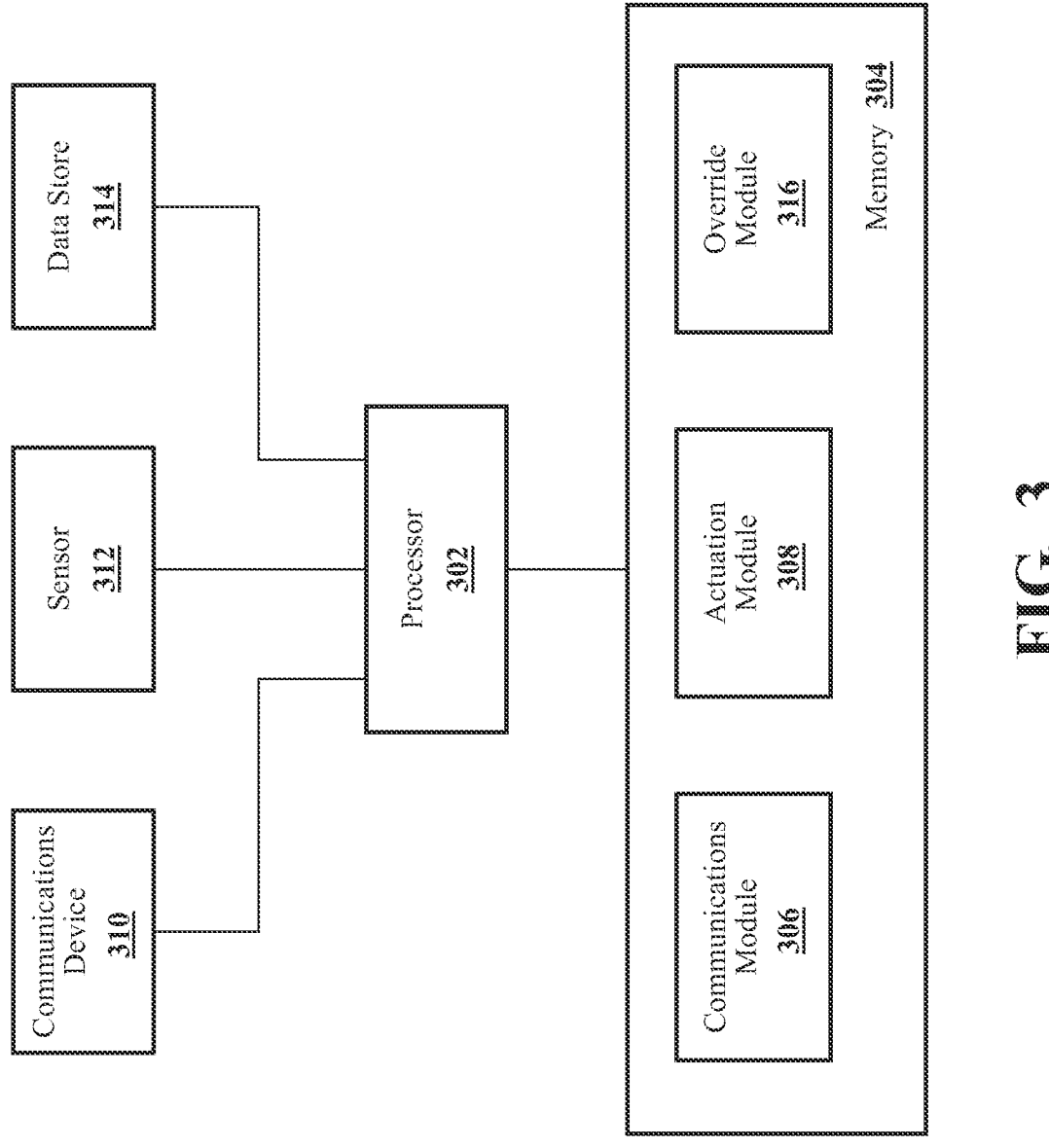
FIG. 3 includes a block diagram that illustrates an example of a system for guiding an individual to cause a vehicle to make a turn correctly, according to the disclosed technologies.

FIG. 3 includes a block diagram that illustrates an example of a system 300 for guiding an individual to cause a vehicle to make a turn correctly, according to the disclosed technologies. The system 300 can include, for example, a processor 302 and a memory 304. The memory 304 can be communicably coupled to the processor 302. For example, the memory 304 can store a communications module 306 and an actuation module 308. For example, the system 300 can be disposed on a vehicle. For example, the vehicle can be the vehicle 200 illustrated in FIG. 2. For example, the processor 302 can be the processor 202 illustrated in FIG. 2. For example, the memory 304 can be the memory 204 illustrated in FIG. 2.

For example, the communications module 306 can include instructions that function to control the processor 302 to obtain information about a specific side of a road on which the vehicle is to be operated.

In an implementation, the system 300 can further include a communications device 310. The communications device 310 can be communicably coupled to the processor 302. For example, the communications device 310 can be the communications device 206 illustrated in FIG. 2. The instructions to obtain the information about the specific side of the road on which the vehicle is to be operated can include instructions to receive, via the communications device 310, a signal that includes the information about the specific side of the road on which the vehicle is to be operated. With reference to FIGS. 1 and 2, for example, prior to operating the third vehicle 170 in the lane #1 118 about fifteen meters south of the first intersection 146, Dorit can have made arrangements with an entity to rent the third vehicle 170. For example, the entity can perform its business operations at the building 158. In conjunction with making arrangements with Dorit to rent the third vehicle 170, the entity can cause a signal, that includes information that the third vehicle 170 is going to be operated in a regime with left-hand traffic, to be communicated from the communications device 160 to the communications device 206 of the vehicle 200 (which can be the third vehicle 170). The vehicle 200 can receive, via the communications device 206, the signal that includes the information that the vehicle 200 is going to be operated in a regime with left-hand traffic and is to be operated on the left side of the road.

Returning to FIG. 3, additionally or alternatively, in another implementation, the system 300 can further include a sensor 312. The sensor 312 can be communicably coupled to the processor 302. For example, the sensor 312 can be the sensor 214 (e.g., a Global Navigation Satellite System (GNSS) sensor) illustrated in FIG. 2. The instructions to obtain the information about the specific side of the road on which the vehicle is to be operated can include instructions to: (1) determine, via the sensor 312, a current location of the vehicle and (2) determine, based on the current location of the vehicle, the specific side of the road on which the vehicle is to be operated. With reference to FIGS. 1 and 2, for example, the vehicle 200 can: (1) determine, via the sensor 214, that the current location of the vehicle 200 is within the United Kingdom and (2) determine, based on the current location of the vehicle 200 being within the United Kingdom, that the vehicle 200 is to be operated on the left side of the road.

Returning to FIG. 3, additionally or alternatively, in yet another implementation, the system 300 can further include the sensor 312. For example, the sensor 312 can be the sensor 216 (e.g., a side-facing camera) illustrated in FIG. 2. The instructions to obtain the information about the specific side of the road on which the vehicle is to be operated can include instructions to: (1) determine, via the sensor 312, a lane marking that indicates the specific side of the road on which the vehicle is to be operated and (2) determine, based on the lane marking, the specific side of the road on which the vehicle is to be operated. With reference to FIGS. 1 and 2, for example, the vehicle 200 (which can be the third vehicle 170) can: (1) determine, via one or more implementations of the sensor 216, one or more of the lane marking 120 or the lane marking 122 and (2) determine, based on the one or more of the lane marking 120 or the lane marking 122, that the vehicle 200 is to be operated on the left side of the road.

Returning to FIG. 3, additionally or alternatively, in still another implementation, the system 300 can further include a data store 314. The data store 314 can be communicably coupled to the processor 302. For example, the data store 314 can store data indicative of a side (e.g., left or right) of the vehicle at which a steering operator interface of the vehicle is disposed. For example, the data store 314 can be the data store 218 illustrated in FIG. 2. The instructions to obtain the information about the specific side of the road on which the vehicle is to be operated can include instructions to: (1) determine a side of the vehicle at which the steering operator interface is disposed and (2) determine, based on the side of the vehicle at which the steering operator interface is disposed, the specific side of the road on which the vehicle is to be operated. With reference to FIG. 2, for example, the vehicle 200 can: (1) determine that the steering operator interface 208 is located on the right side of the vehicle 200 and (2) determine, based on the steering operator interface 208 being located on the right side of the vehicle 200, that the vehicle 200 is to be operated on the left side of the road.

Returning to FIG. 3, for example, the communications module 306 can include instructions that function to control the processor 302 to obtain information about a degree of familiarity of the individual in operating the vehicle on the specific side.

In an implementation, the system 300 can further include the communications device 310. For example, the communications device 310 can be the communications device 206 illustrated in FIG. 2. The instructions to obtain the information about the degree of familiarity of the individual in operating the vehicle on the specific side can include instructions to receive, via the communications device 310, a signal that includes the information about the degree of familiarity of the individual in operating the vehicle on the specific side. With reference to FIGS. 1 and 2, for example, prior to operating the third vehicle 170 in the lane #1 118, Dorit can have made arrangements with an entity to rent the third vehicle 170. In conjunction with making arrangements, Dorit can have communicated to the entity that she has a reasonable degree of familiarity in operating a vehicle in a regime with left-hand traffic. For example, the entity can perform its business operations at the building 158. In conjunction with making arrangements with Dorit to rent the third vehicle 170, the entity can cause a signal, that includes information that Dorit has a reasonable degree of familiarity in operating a vehicle on the left side of the road, to be communicated from the communications device 160 to the communications device 206 of the vehicle 200 (which can be the third vehicle 170). The vehicle 200 can receive, via the communications device 206, the signal that includes the information that Dorit has a reasonable degree of familiarity in operating a vehicle on the left side of the road. Additionally or alternatively, for example, a profile of Dorit that includes historical information about her operations of vehicles can be stored by the cloud computing platform 162. The cloud computing platform 162 can cause at least some of the information included in the profile of Dorit, including the information that Dorit has a reasonable degree of familiarity in operating a vehicle on the left side of the road, to be communicated from the communications device 164 to the communications device 206 of the vehicle 200 (which can be the third vehicle 170). The vehicle 200 can receive, via the communications device 206, the signal that includes the information that Dorit has a reasonable degree of familiarity in operating a vehicle on the left side of the road.

Returning to FIG. 3, additionally or alternatively, in another implementation, the system 300 can be configured to be coupled to a user interface. The user interface can be communicably coupled to the processor 302. The user interface can be configured to receive information from an individual who is, has, or will be operating the vehicle. For example, the user interface can be the user interface 220 illustrated in FIG. 2. The instructions to obtain the information about the degree of familiarity of the individual in operating the vehicle on the specific side can include instructions to receive, via the user interface, a signal that includes the information about the degree of familiarity of the individual in operating the vehicle on the specific side. With reference to FIGS. 1 and 2, for example, the vehicle 200 (which can be the third vehicle 170) can receive, via the user interface 220, a signal that includes the information that Dorit has a reasonable degree of familiarity in operating a vehicle on the left side of the road.

Returning to FIG. 3, additionally or alternatively, in yet another implementation, the system 300 can further include the sensor 312. For example, the sensor 312 can be the sensor 222 (e.g., one or more of the gaze-tracking system 224, the still image camera 226, the video camera 228, the infrared camera 230, or the like) illustrated in FIG. 2. The instructions to obtain the information about the degree of familiarity of the individual in operating the vehicle on the specific side can include instructions to: (1) obtain, via the sensor 312, information indicative of a cognitive state of the individual and (2) determine, based on the information indicative of the cognitive state of the individual, the degree of familiarity of the individual in operating the vehicle on the specific side. The information indicative of the cognitive state of the individual can be produced at a time in which the vehicle was being operated on the specific side of the road. With reference to FIGS. 1 and 2, for example, while operating the third vehicle 170 in the lane #1 118 about fifteen meters south of the first intersection 146, Dorit can exhibit physical manifestations indicative of her cognitive state with respect to her degree of familiarity in operating the third vehicle 170 in a regime with left-hand traffic. The vehicle 200 (which can be the third vehicle 170) can: (1) obtain, via the sensor 222 at a time in which the third vehicle 170 is being operated on the left side of the road, the information indicative of the cognitive state of Dorit and (2) determine, based on the information indicative of the cognitive state of Dorit, the degree of familiarity of Dorit in operating the third vehicle 170 on the left side of the road.

Returning to FIG. 3, for example, the actuation module 308 can include instructions that function to control the processor 302 to cause, in response to the degree of familiarity being less than a threshold, a possible change to a normal operation of a steering operator interface of the vehicle, in response to a receipt of an input from the individual, to guide the individual to cause the vehicle to make the turn correctly.

In an implementation, the instructions to cause the possible change to the normal operation of the steering operator interface include instructions to cause a change to a steering torque feedback. A steering torque feedback can be produced by contact between a tire of the vehicle and a surface of the road, conveyed through one or more mechanisms of the steering operator interface, and perceived by the individual operating the vehicle. For example, a power assist steering mechanism can be connected to the steering operator interface and can act to add to or subtract from torque conveyed through the one or more mechanisms of the steering operator interface to assist the individual in operating the steering operator interface. For example, the power assist steering mechanism can be an electric power assist steering mechanism. For example, the change to the steering torque feedback can be maintained throughout the turn regardless of a speed of the vehicle. For example, the instructions to cause the possible change to the normal operation of the steering operator interface include instructions to cause a first signal to be sent to a controller. The controller can be configured to send, in response to a receipt of the first signal, a second signal to an actuator. With reference to FIG. 2, for example, the instructions to cause the possible change to the normal operation of the steering operator interface 208 can include instructions to cause the first signal to be sent to the controller 232. The controller 232 can be configured to send, in response to the receipt of the first signal, the second signal to the actuator 234. For example, one or more of the controller 232 or the actuator 234 can be associated with one or more of a power assist steering mechanism or an electric power assist steering system.

Returning to FIG. 3, for example, if: (1) the turn is to be initiated at an intersection, (2) the specific side of the road is either left or right, (3) a direction of the turn is either left or right, and (4) the direction of the turn is opposite of the specific side, then the change to the steering torque feedback can be an increase of the steering torque feedback. With reference to FIGS. 1 and 2, for example, for the third vehicle 170 if: (1) the turn is to be initiated at the first intersection 146, (2) the third vehicle 170 is being operated on the left side of Anglo Avenue 104, (3) a direction 172 of the turn is to the right, and (4) the direction of the turn (i.e., to the right) is opposite of the side of the road on which the third vehicle 170 is operating (i.e., the left side of the road), then the change to the steering torque feedback can be an increase of the steering torque feedback. Such an increase of the steering torque feedback can cause Dorit to need to apply a greater degree of torque to the steering operator interface 208 in order to cause the third vehicle 170 to make the turn in the left direction, which can reduce a likelihood that Dorit will oversteer the third vehicle 170 into oncoming traffic.

Returning to FIG. 3, additionally or alternatively, for example, if: (1) the turn is to be initiated at an intersection, (2) the specific side of the road is either left or right, (3) a direction of the turn is either left or right, and (4) the direction of the turn is identical to the specific side, then the change to the steering torque feedback can be a decrease of the steering torque feedback. With reference to FIGS. 1 and 2, for example, for the first vehicle 166 if: (1) the turn is to be initiated at the second intersection 148, (2) the first vehicle 166 is being operated on the left side of Buckingham Street 102, (3) the direction of the turn is to the left, and (4) a direction 174 of the turn (i.e., to the left) is identical to of the side of the road on which the first vehicle 166 is operating (i.e., the left side of the road), then the change to the steering torque feedback can be a decrease of the steering torque feedback. Such a decrease of the steering torque feedback can cause Audrey to need to apply a lesser degree of torque to the steering operator interface 208 in order to cause the first vehicle 166 to make the turn in the left direction, which can reduce a likelihood that Audrey will understeer the first vehicle 166 into oncoming traffic.

Returning to FIG. 3, additionally or alternatively, in another implementation, the instructions to cause the possible change to the normal operation of the steering operator interface include instructions to cause a change to a steering ratio. A steering ratio can be a ratio between a measure of a change of a position of the steering operator interface and a measure of a degree of a rotation of a wheel of the vehicle. The wheel can be a wheel used to cause the turn. For example, the measure of the change of the position of the steering operator interface can include a measure of a degree of rotation of the steering operator interface. For example, such a change to the steering ratio can be produced by a variable-ratio steering mechanism, an adaptive steering mechanism, an active steering mechanism, or the like. For example, the change to the steering ratio can be maintained throughout the turn regardless of a speed of the vehicle. For example, the instructions to cause the possible change to the normal operation of the steering operator interface include instructions to cause a first signal to be sent to a controller. The controller can be configured to send, in response to a receipt of the first signal, a second signal to an actuator. With reference to FIG. 2, for example, the instructions to cause the possible change to the normal operation of the steering operator interface 208 can include instructions to cause the first signal to be sent to the controller 232. The controller 232 can be configured to send, in response to the receipt of the first signal, the second signal to the actuator 234. For example, one or more of the controller 232 or the actuator 234 can be associated with one or more of a variable-ratio steering mechanism, an adaptive steering mechanism, an active steering mechanism, a steering effort control module, or the like. Additionally, for example, the actuator 234 can be associated with one or more of a motor, a worm gear, a toothed gear, or the like.

Returning to FIG. 3, for example, if: (1) the turn is to be initiated at an intersection, (2) the specific side of the road is either left or right, (3) a direction of the turn is either left or right, and (4) the direction of the turn is opposite of the specific side, then the change to the steering ratio can be a decrease of the steering ratio. With reference to FIGS. 1 and 2, for example, for the third vehicle 170 if: (1) the turn is to be initiated at the first intersection 146, (2) the third vehicle 170 is being operated on the left side of Anglo Avenue 104, (3) the direction 172 of the turn is to the right, and (4) the direction of the turn (i.e., to the right) is opposite of the side of the road on which the third vehicle 170 is operating (i.e., the left side of the road), then the change to the steering ratio can be a decrease of the steering ratio. Such a decrease of the steering ratio can cause Dorit to need to change the position of the steering operator interface 208 by a greater degree in order to cause the third vehicle 170 to make the turn in the right direction, which can reduce a likelihood that Dorit will oversteer the third vehicle 170 into oncoming traffic.

Returning to FIG. 3, for example, if: (1) the turn is to be initiated at an intersection, (2) the specific side of the road is either left or right, (3) a direction of the turn is either left or right, and (4) the direction of the turn is identical to the specific side, then the change to the steering ratio can be an increase of the steering ratio. With reference to FIGS. 1 and

2, for example, for the first vehicle 166 if: (1) the turn is to be initiated at the second intersection 148, (2) the first vehicle 166 is being operated on the left side of Buckingham Street 102. (3) the direction 174 of the turn is to the left, and (4) the direction of the turn (i.e., to the left) is identical to the side of the road on which the first vehicle 166 is operating (i.e., the left side of the road), then the change to the steering ratio can be an increase of the steering ratio. Such an increase of the steering ratio can cause Audrey to need to change the position of the steering operator interface 208 by a lesser degree in order to cause the first vehicle 166 to make the left in the right direction, which can reduce a likelihood that Audrey will understeer the first vehicle 166 into oncoming traffic.

Returning to FIG. 3, in an implementation, the communications module 306 can further include instructions that function to control the processor 302 to obtain information indicative of an acknowledgement, by the individual who is, has, or will be operating the vehicle, that the system 300 includes instructions to cause the possible change to the normal operation of the steering operator interface.

For example, the system 300 can further include the communications device 310. For example, the communications device 310 can be the communications device 206 illustrated in FIG. 2.

With reference to FIGS. 1 and 2, for example, prior to operating the first vehicle 166 in the lane #1 108, Audrey, who believes that she has a low degree of familiarity in operating a vehicle in a regime with left-hand traffic, can have made arrangements with an entity to rent the first vehicle 166. For example, the entity can perform its business operations at the building 158. In conjunction with making arrangements with Audrey to rent the first vehicle 166, the entity can cause a signal, that enables the system 300 for the vehicle 200 (which can be the first vehicle 166), to be communicated from the communications device 160 to the communications device 206 of the vehicle 200. The first vehicle 166 can receive, via the communications device 206, the signal that enables the system 300 for the vehicle 200.

For example, prior to operating the second vehicle 168 in the lane #1 108, Brigitte, who believes that she has a high degree of familiarity in operating a vehicle in a regime with left-hand traffic, can have made arrangements with the entity to rent the second vehicle 168. In conjunction with making arrangements with Brigitte to rent the second vehicle 168, the entity can refrain from causing a signal, that enables the system 300 for the vehicle 200 (which can be the second vehicle 168), to be communicated from the communications device 160 to the communications device 206 of the vehicle 200. Accordingly, the second vehicle 168 will not receive, via the communications device 206, the signal that enables the system 300 for the vehicle 200.

For example, prior to operating the third vehicle 170 in the lane #1 118, Dorit, who believes that she has a reasonable degree of familiarity in operating a vehicle in a regime with left-hand traffic, can have made arrangements with the entity to rent the third vehicle 170. In conjunction with making arrangements with Dorit to rent the third vehicle 170, the entity can refrain from causing a signal, that enables the system 300 for the vehicle 200 (which can be the third vehicle 170), to be communicated from the communications device 160 to the communications device 206 of the vehicle 200. Accordingly, the third vehicle 170 will not receive, via the communications device 206, the signal that enables the system 300 for the vehicle 200.

Returning to FIG. 3, additionally or alternatively, for example, the system 300 can be configured to be coupled to a user interface. The user interface can be communicably coupled to the processor 302. The user interface can be configured to receive information from an individual who is, has, or will be operating the vehicle. For example, the user interface can be the user interface 220 illustrated in FIG. 2. The instructions to obtain the information indicative of the acknowledgement, by the individual who is, has, or will be operating the vehicle, that the system 300 includes instructions to cause the possible change to the normal operation of the steering operator interface can include instructions to receive, via the user interface, a signal that enables the system 300 for the vehicle 200. With reference to FIGS. 1 and 2, for example, the vehicle 200 (which can be the third vehicle 170) can receive, via the user interface 220, a signal that enables the system 300 for the third vehicle 170.

Returning to FIG. 3, in an implementation, the actuation module 308 can further include instructions that function to control the processor 302 to define, in response to a receipt of information indicative that a probability that the vehicle is about to make the turn is greater than a probability threshold, a first time as a time at which to commence the possible change to the normal operation of the steering operator interface. For example, the first time can be a time at which a turn signal device is placed in operation. For example, the turn signal device can be the left turn signal device 240 of the vehicle 200 or the right turn signal device 242 of the vehicle 200 illustrated in FIG. 2. Additionally or alternatively, the first time can be a time at which a speed of the vehicle is less than a threshold speed. For example, the threshold speed can be ten kilometers per hour. With reference to FIG. 2, for example, the speed of the vehicle 200 can be determined by the speedometer 244.

Returning to FIG. 3, in an extension of this implementation, the actuation module 308 can further include instructions that function to control the processor 302 to define, in response to having defined the first time, a second time as a time at which to cease the possible change to the normal operation of the steering operator interface. For example, the second time can be a duration of time after the first time. For example, the duration of time can be five seconds. With reference to FIG. 2, for example, the duration of time can be determined by the timer 246.

Returning to FIG. 3, in a further extension of this implementation, the actuation module 308 can further include instructions that function to control the processor 302 to define, in response to having defined the second time, a duration of time during which to cause the possible change to the normal operation of the steering operator interface. For example, within the duration of time: (1) a general direction of the turn can be either left or right and (2) the possible change to the normal operation of the steering operator interface can occur throughout the duration of time even if a specific direction of the turn, at a specific point in time within the duration of time, is opposite of the general direction of the turn. With reference to FIG. 1, for example, although the general direction 174 of the turn of the third vehicle 170 is to the left from the lane #1 118 of Buckingham Street 102 at the second intersection 148 to Saxon Boulevard 106, this general direction 174 of the turn to the left can include: (1) a specific direction 176 to the left to the lane #1 128 of Saxon Boulevard 106 followed by (2) a specific direction 178 to the right to the lane #2 134 of Saxon Boulevard 106 followed by (3) a specific direction 180 to the left into the lane #2 134 of Saxon Boulevard 106. The possible change to the normal operation of the steering operator interface can occur throughout the duration of time of the general direction 174 of the turn to the left even though the specific direction 178 to the right is opposite of the general direction 174 of the turn to the left.

Returning to FIG. 3, in an implementation, the memory 304 can further store an override module 316. For example, the override module 316 can include instructions that function to control the processor 302 to: (1) obtain information about an existence of a condition in which a probability that the possible change to the normal operation will be detrimental to an operation of the vehicle is greater than a probability threshold and (2) cause, in response to a determination of the existence of the condition, the possible change to the normal operation of the steering operator interface to be a lack of change to the normal operation of the steering operator interface.

For example, the condition can be a speed of the vehicle being greater than a threshold speed. For example, the threshold speed can be fifty kilometers per hour. With reference to FIG. 2, for example, the speed of the vehicle 200 can be determined by the speedometer 244. With reference to FIG. 1, for example, if the speed of the third vehicle 170 is greater than fifty kilometers per hour, then the override module 316 can cause the possible change to the normal operation of the steering operator interface to be a lack of change to the normal operation of the steering operator interface.

Returning to FIG. 3, additionally or alternatively, for example, the system 300 can further include the sensor 312. For example, the sensor 312 can be the sensor 248 (e.g., a forward-facing camera) illustrated in FIG. 2. The instructions to obtain the information about the existence of the condition can include instructions to receive, via the sensor 312, the information about the existence of the condition. For example, the information about the existence of the condition received via the sensor 312 can be an image of a traffic light. For example, the existence of the condition can be an illumination of a first light of the traffic light. For example, the first light can have a color (e.g., yellow) associated with a message that the vehicle is to proceed with caution in anticipation of the traffic light causing a second light to be illuminated. The second light can have a color (e.g., red) associated with a message that the vehicle is to stop. With reference to FIGS. 1 and 2, for example, if the sensor 248 (e.g., a forward-facing camera) of the vehicle 200 (which can be the third vehicle 170) receives an image of the traffic light 150 and the second light 154 is illuminated (e.g., yellow), then the override module 316 can cause the possible change to the normal operation of the steering operator interface to be a lack of change to the normal operation of the steering operator interface.

FIGS. 4A and 4B include a flow diagram that illustrates an example of a method 400 that is associated with guiding an individual to cause a vehicle to make a turn correctly, according to the disclosed technologies. Although the method 400 is described in combination with the system 300 illustrated in FIG. 3, one of skill in the art understands, in light of the description herein, that the method 400 is not limited to being implemented by the system 300 illustrated in FIG. 3. Rather, the system 300 illustrated in FIG. 3 is an example of a system that may be used to implement the method 400. Additionally, although the method 400 is illustrated as a generally serial process, various aspects of the method 400 may be able to be executed in parallel. For example, operations of the method 400 can be performed by a mobile robot. For example, the mobile robot can include an automated vehicle.

In FIG. 4A, in the method 400, at an operation 402, for example, the communications module 306 can obtain information about a specific side of a road on which the vehicle is to be operated.

In an implementation, the communications module 306 can obtain the information about the specific side of the road on which the vehicle is to be operated by receiving, via the communications device 310, a signal that includes the information about the specific side of the road on which the vehicle is to be operated.

Additionally or alternatively, in another implementation, the communications module 306 can obtain the information about the specific side of the road on which the vehicle is to be operated by: (1) determining, via the sensor 312, a current location of the vehicle and (2) determining, based on the current location of the vehicle, the specific side of the road on which the vehicle is to be operated.

Additionally or alternatively, in yet another implementation, the communications module 306 can obtain the information about the specific side of the road on which the vehicle is to be operated by: (1) determining, via the sensor 312, a lane marking that indicates the specific side of the road on which the vehicle is to be operated and (2) determining, based on the lane marking, the specific side of the road on which the vehicle is to be operated.

Additionally or alternatively, in still another implementation, the communications module 306 can obtain the information about the specific side of the road on which the vehicle is to be operated by: (1) determining a side of the vehicle at which the steering operator interface is disposed and (2) determining, based on the side of the vehicle at which the steering operator interface is disposed, the specific side of the road on which the vehicle is to be operated.

At an operation 404, for example, the communications module 306 can obtain information about a degree of familiarity of the individual in operating the vehicle on the specific side.

In an implementation, the communications module 306 can obtain the information about the degree of familiarity of the individual in operating the vehicle on the specific side by receiving, via the communications device 310, a signal that includes the information about the degree of familiarity of the individual in operating the vehicle on the specific side.

Additionally or alternatively, in another implementation, the communications module 306 can obtain the information about the degree of familiarity of the individual in operating the vehicle on the specific side by receiving, via a user interface, a signal that includes the information about the degree of familiarity of the individual in operating the vehicle on the specific side.

Additionally or alternatively, in yet another implementation, the communications module 306 can obtain the information about the degree of familiarity of the individual in operating the vehicle on the specific side by: (1) obtaining, via the sensor 312, information indicative of an cognitive state of the individual and (2) determining, based on the information indicative of the cognitive state of the individual, the degree of familiarity of the individual in operating the vehicle on the specific side.

In FIG. 4B, in the method 400, at an operation 406, for example, the actuation module 308 can cause, in response to the degree of familiarity being less than a threshold, a possible change to a normal operation of a steering operator interface of the vehicle, in response to a receipt of an input from the individual, to guide the individual to cause the vehicle to make the turn correctly.

In an implementation, the actuation module 308 can cause the possible change to the normal operation of a steering operator interface by causing a change to a steering torque feedback.

For example, if: (1) the turn is to be initiated at an intersection, (2) the specific side of the road is either left or right. (3) a direction of the turn is either left or right, and (4) the direction of the turn is opposite of the specific side, then the change to the steering torque feedback can be an increase of the steering torque feedback.

Additionally or alternatively, for example, if: (1) the turn is to be initiated at an intersection, (2) the specific side of the road is either left or right, (3) a direction of the turn is either left or right, and (4) the direction of the turn is identical to the specific side, then the change to the steering torque feedback can be a decrease of the steering torque feedback.

Additionally or alternatively, in another implementation, the communications module 306 can cause the possible change to the normal operation of a steering operator interface by causing a change to a steering ratio.

For example, if: (1) the turn is to be initiated at an intersection, (2) the specific side of the road is either left or right, (3) a direction of the turn is either left or right, and (4) the direction of the turn is opposite of the specific side, then the change to the steering ratio can be a decrease of the steering ratio.

Additionally or alternatively, if: (1) the turn is to be initiated at an intersection, (2) the specific side of the road is either left or right, (3) a direction of the turn is either left or right, and (4) the direction of the turn is identical to the specific side, then the change to the steering ratio can be an increase of the steering ratio.

In FIG. 4A, in the method 400, in an implementation, at an operation 408, the communications module 306 can obtain information indicative of an acknowledgement, by the individual who is, has, or will be operating the vehicle, that the method 400 includes causing the possible change to the normal operation of the steering operator interface.

In an implementation, at an operation 410, the actuation module 308 can define, in response to a receipt of information indicative that a probability that the vehicle is about to make the turn is greater than a probability threshold, a first time as a time at which to commence the possible change to the normal operation of the steering operator interface.

In FIG. 4B, in the method 400, in an extension of this implementation, at an operation 412, the actuation module 308 can define, in response to having defined the first time, a second time as a time at which to cease the possible change to the normal operation of the steering operator interface.

In a further extension of this implementation, at an operation 414, the actuation module 308 can define, in response to having defined the second time, a duration of time during which to cause the possible change to the normal operation of the steering operator interface.

In FIG. 4A, in the method 400, in an implementation, at an operation 416, the override module 316 can obtain information about an existence of a condition in which a probability that the possible change to the normal operation will be detrimental to an operation of the vehicle is greater than a probability threshold.

In FIG. 4B, in the method 400, in this implementation, at an operation 418, the override module 316 can cause, in response to a determination of the existence of the condition, the possible change to the normal operation of the steering operator interface to be a lack of change to the normal operation of the steering operator interface.

Figure 5:
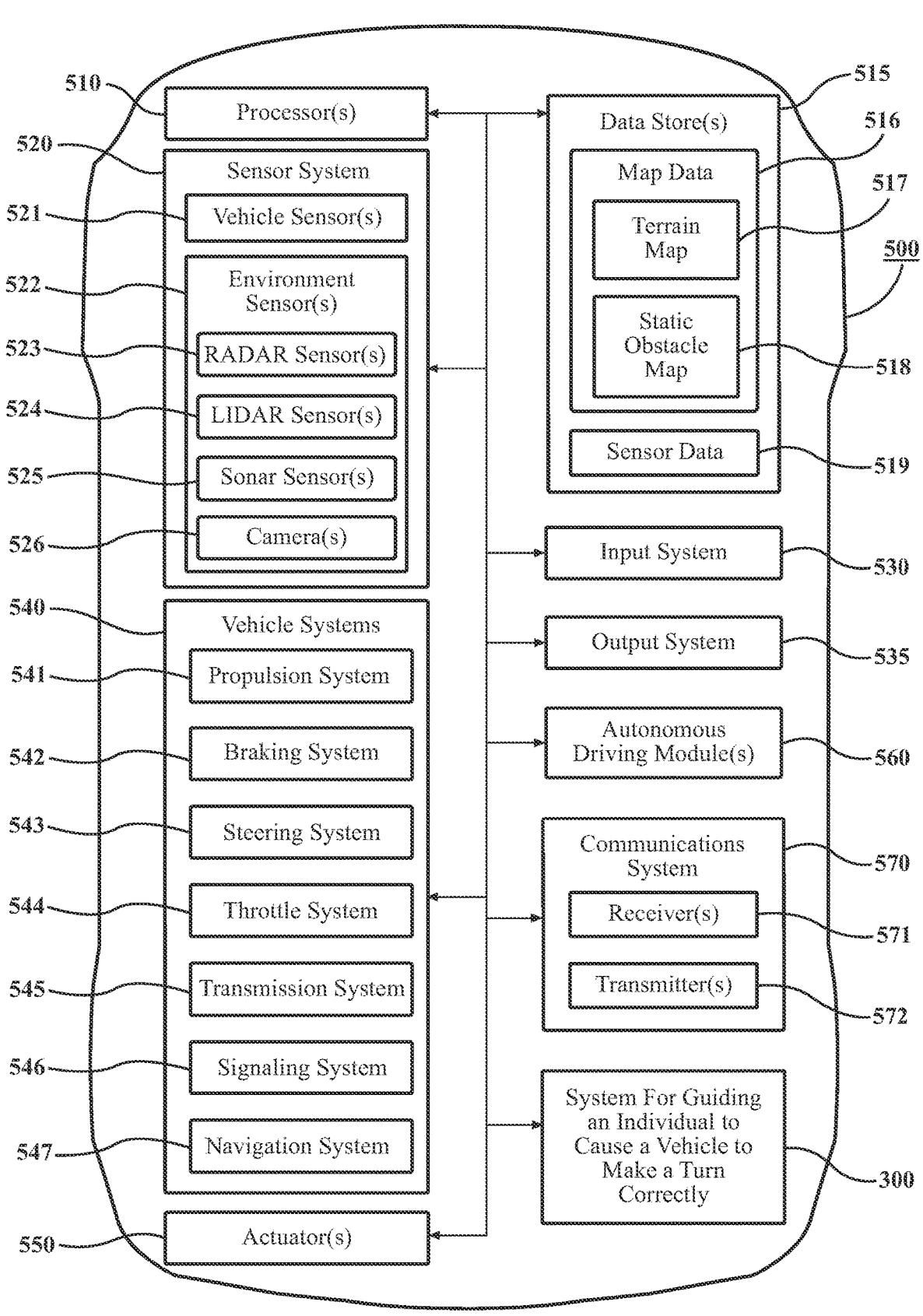
FIG. 5 includes a block diagram that illustrates an example of elements disposed on a vehicle, according to the disclosed technologies.

FIG. 5 includes a block diagram that illustrates an example of elements disposed on a vehicle 500, according to the disclosed technologies. As used herein, a "vehicle" can be any form of powered transport. In one or more implementations, the vehicle 500 can be an automobile. While arrangements described herein are with respect to automobiles, one of skill in the art understands, in light of the description herein, that embodiments are not limited to automobiles. For example, functions and/or operations of one or more of the first vehicle 166 (illustrated in FIG. 1), the second vehicle 168 (illustrated in FIG. 1), the third vehicle 170 (illustrated in FIG. 1), or the vehicle 200 (illustrated in FIG. 2) can be realized by the vehicle 500.

In some embodiments, the vehicle 500 can be configured to switch selectively between an automated mode, one or more semi-automated operational modes, and/or a manual mode. Such switching can be implemented in a suitable manner, now known or later developed. As used herein, "manual mode" can refer that all of or a majority of the navigation and/or maneuvering of the vehicle 500 is performed according to inputs received from a user (e.g., human driver). In one or more arrangements, the vehicle 500 can be a conventional vehicle that is configured to operate in only a manual mode.

In one or more embodiments, the vehicle 500 can be an automated vehicle. As used herein, "automated vehicle" can refer to a vehicle that operates in an automated mode. As used herein, "automated mode" can refer to navigating and/or maneuvering the vehicle 500 along a travel route using one or more computing systems to control the vehicle 500 with minimal or no input from a human driver. In one or more embodiments, the vehicle 500 can be highly automated or completely automated. In one embodiment, the vehicle 500 can be configured with one or more semi-automated operational modes in which one or more computing systems perform a portion of the navigation and/or maneuvering of the vehicle along a travel route, and a vehicle operator (i.e., driver) provides inputs to the vehicle 500 to perform a portion of the navigation and/or maneuvering of the vehicle 500 along a travel route.

For example, Standard J3016, Taxonomy and Definitions for Terms Related to Driving Automation Systems for On-Road Motor Vehicles, issued by the Society of Automotive Engineers (SAE) International on Jan. 16, 2014, and most recently revised on Jun. 15, 2018, defines six levels of driving automation. These six levels include: (1) level 0, no automation, in which all aspects of dynamic driving tasks are performed by a human driver; (2) level 1, driver assistance, in which a driver assistance system, if selected, can execute, using information about the driving environment, either steering or acceleration/deceleration tasks, but all remaining driving dynamic tasks are performed by a human driver; (3) level 2, partial automation, in which one or more driver assistance systems, if selected, can execute, using information about the driving environment, both steering and acceleration/deceleration tasks, but all remaining driving dynamic tasks are performed by a human driver; (4) level 3, conditional automation, in which an automated driving system, if selected, can execute all aspects of dynamic driving tasks with an expectation that a human driver will respond appropriately to a request to intervene; (5) level 4, high automation, in which an automated driving system, if selected, can execute all aspects of dynamic driving tasks even if a human driver does not respond appropriately to a request to intervene; and (6) level 5, full automation, in which an automated driving system can execute all aspects of dynamic driving tasks under all roadway and environmental conditions that can be managed by a human driver.

The vehicle 500 can include various elements. The vehicle 500 can have any combination of the various elements illustrated in FIG. 5. In various embodiments, it may not be necessary for the vehicle 500 to include all of the elements illustrated in FIG. 5. Furthermore, the vehicle 500 can have elements in addition to those illustrated in FIG. 5. While the various elements are illustrated in FIG. 5 as being located within the vehicle 500, one or more of these elements can be located external to the vehicle 500. Furthermore, the elements illustrated may be physically separated by large distances. For example, as described, one or more components of the disclosed system can be implemented within the vehicle 500 while other components of the system can be implemented within a cloud-computing environment, as described below. For example, the elements can include one or more processors 510, one or more data stores 515, a sensor system 520, an input system 530, an output system 535, vehicle systems 540, one or more actuators 550, one or more automated driving modules 560, a communications system 570, and the system 300 for guiding an individual to cause a vehicle to make a turn correctly.

In one or more arrangements, the one or more processors 510 can be a main processor of the vehicle 500. For example, the one or more processors 510 can be an electronic control unit (ECU). For example, functions and/or operations of one or more of the processor 202 (illustrated in FIG. 2), the controller 232 (illustrated in FIG. 2), or the processor 302 (illustrated in FIG. 3) can be realized by the one or more processors 510.

The one or more data stores 515 can store, for example, one or more types of data. The one or more data stores 515 can include volatile memory and/or non-volatile memory. For example, functions and/or operations of one or more of the memory 204 (illustrated in FIG. 2), the data store 218 (illustrated in FIG. 2), the memory 304 (illustrated in FIG. 3), or the data store 314 (illustrated in FIG. 3) can be realized by the one or more data stores 515. Examples of suitable memory for the one or more data stores 515 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 515 can be a component of the one or more processors 510. Additionally or alternatively, the one or more data stores 515 can be operatively connected to the one or more processors 510 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 515 can store map data 516. The map data 516 can include maps of one or more geographic areas. In some instances, the map data 516 can include information or data on roads, traffic control devices, road markings, structures, features, and/or landmarks in the one or more geographic areas. The map data 516 can be in any suitable form. In some instances, the map data 516 can include aerial views of an area. In some instances, the map data 516 can include ground views of an area, including 360-degree ground views. The map data 516 can include measurements, dimensions, distances, and/or information for one or more items included in the map data 516 and/or relative to other items included in the map data 516. The map data 516 can include a digital map with information about road geometry. The map data 516 can be high quality and/or highly detailed.

In one or more arrangements, the map data 516 can include one or more terrain maps 517. The one or more terrain maps 517 can include information about the ground, terrain, roads, surfaces, and/or other features of one or more geographic areas. The one or more terrain maps 517 can include elevation data of the one or more geographic areas. The map data 516 can be high quality and/or highly detailed. The one or more terrain maps 517 can define one or more ground surfaces, which can include paved roads, unpaved roads, land, and other things that define a ground surface.

In one or more arrangements, the map data 516 can include one or more static obstacle maps 518. The one or more static obstacle maps 518 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 518 can have location data, size data, dimension data, material data, and/or other data associated with them. The one or more static obstacle maps 518 can include measurements, dimensions, distances, and/or information for one or more static obstacles. The one or more static obstacle maps 518 can be high quality and/or highly detailed. The one or more static obstacle maps 518 can be updated to reflect changes within a mapped area.

In one or more arrangements, the one or more data stores 515 can store sensor data 519. As used herein, "sensor data" can refer to any information about the sensors with which the vehicle 500 can be equipped including the capabilities of and other information about such sensors. The sensor data 519 can relate to one or more sensors of the sensor system 520. For example, in one or more arrangements, the sensor data 519 can include information about one or more lidar sensors 524 of the sensor system 520.

In some arrangements, at least a portion of the map data 516 and/or the sensor data 519 can be located in one or more data stores 515 that are located onboard the vehicle 500. Additionally or alternatively, at least a portion of the map data 516 and/or the sensor data 519 can be located in one or more data stores 515 that are located remotely from the vehicle 500.

The sensor system 520 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 520 includes a plurality of sensors, the sensors can work independently from each other. Alternatively, two or more of the sensors can work in combination with each other. In such a case, the two or more sensors can form a sensor network. The sensor system 520 and/or the one or more sensors can be operatively connected to the one or more processors 510, the one or more data stores 515, and/or another element of the vehicle 500 (including any of the elements illustrated in FIG. 5). The sensor system 520 can acquire data of at least a portion of the external environment of the vehicle 500 (e.g., nearby vehicles). The sensor system 520 can include any suitable type of sensor. Various examples of different types of sensors are described herein. However, one of skill in the art understands that the embodiments are not limited to the particular sensors described herein.

The sensor system 520 can include one or more vehicle sensors 521. The one or more vehicle sensors 521 can detect, determine, and/or sense information about the vehicle 500 itself. In one or more arrangements, the one or more vehicle sensors 521 can be configured to detect and/or sense position and orientation changes of the vehicle 500 such as, for example, based on inertial acceleration. In one or more arrangements, the one or more vehicle sensors 521 can include one or more accelerometers, one or more gyroscopes, an inertial measurement unit (IMU), a dead-reckoning system, a global navigation satellite system (GNSS), a global positioning system (GPS), a navigation system 547, and/or other suitable sensors. The one or more vehicle sensors 521 can be configured to detect and/or sense one or more characteristics of the vehicle 500. In one or more arrangements, the one or more vehicle sensors 521 can include a speedometer to determine a current speed of the vehicle 500. For example, functions and/or operations of one or more of the sensor 214 (e.g., a Global Navigation Satellite System (GNSS) sensor) (illustrated in FIG. 2), the speedometer 244 (illustrated in FIG. 2), or the sensor 312 (illustrated in FIG. 3) can be realized by the one or more vehicle sensors 521.

Additionally or alternatively, the sensor system 520 can include one or more environment sensors 522 configured to acquire and/or sense driving environment data. As used herein, "driving environment data" can include data or information about the external environment in which a vehicle is located or one or more portions thereof. For example, the one or more environment sensors 522 can be configured to detect, quantify, and/or sense obstacles in at least a portion of the external environment of the vehicle 500 and/or information/data about such obstacles. Such obstacles may be stationary objects and/or dynamic objects. The one or more environment sensors 522 can be configured to detect, measure, quantify, and/or sense other things in the external environment of the vehicle 500 such as, for example, lane markers, signs, traffic lights, traffic signs, lane lines, crosswalks, curbs proximate the vehicle 500, off-road objects, etc.

Various examples of sensors of the sensor system 520 are described herein. The example sensors may be part of the one or more vehicle sensors 521 and/or the one or more environment sensors 522. However, one of skill in the art understands that the embodiments are not limited to the particular sensors described.

In one or more arrangements, the one or more environment sensors 522 can include one or more radar sensors 523, one or more lidar sensors 524, one or more sonar sensors 525, and/or one more cameras 526. In one or more arrangements, the one or more cameras 526 can be one or more high dynamic range (HDR) cameras or one or more infrared (IR) cameras. For example, the one or more cameras 526 can be used to record a reality of a state of an item of information that can appear in the digital map. For example, functions and/or operations of one or more of the sensor 216 (e.g., a side-facing camera) (illustrated in FIG. 2), the sensor 222 (e.g., the gaze-tracking system 224 (illustrated in FIG. 2), the still image camera 226 (illustrated in FIG. 2), the video camera 228 (illustrated in FIG. 2), or the infrared camera 230 (illustrated in FIG. 2)) (illustrated in FIG. 2), the sensor 248 (e.g., a forward-facing camera) (illustrated in FIG. 2), or the sensor 312 (illustrated in FIG. 3) can be realized by the one or more cameras 526.

The input system 530 can include any device, component, system, element, arrangement, or groups thereof that enable information/data to be entered into a machine. The input system 530 can receive an input from a vehicle passenger (e.g., a driver or a passenger). The output system 535 can include any device, component, system, element, arrangement, or groups thereof that enable information/data to be presented to a vehicle passenger (e.g., a driver or a passenger). For example, functions and/or operations of the user interface 220 (illustrated in FIG. 2) can be realized by the input system 530.

Various examples of the one or more vehicle systems 540 are illustrated in FIG. 5. However, one of skill in the art understands that the vehicle 500 can include more, fewer, or different vehicle systems. Although particular vehicle systems can be separately defined, each or any of the systems or portions thereof may be otherwise combined or segregated via hardware and/or software within the vehicle 500. For example, the one or more vehicle systems 540 can include a propulsion system 541, a braking system 542, a steering system 543, a throttle system 544, a transmission system 545, a signaling system 546, and/or the navigation system 547. Each of these systems can include one or more devices, components, and/or a combination thereof, now known or later developed. For example, functions and/or operations of the steering operator interface 208 (illustrated in FIG. 2) can be realized by the steering system 543.

The navigation system 547 can include one or more devices, applications, and/or combinations thereof, now known or later developed, configured to determine the geographic location of the vehicle 500 and/or to determine a travel route for the vehicle 500. The navigation system 547 can include one or more mapping applications to determine a travel route for the vehicle 500. The navigation system 547 can include a global positioning system, a local positioning system, a geolocation system, and/or a combination thereof.

The one or more actuators 550 can be any element or combination of elements operable to modify, adjust, and/or alter one or more of the vehicle systems 540 or components thereof responsive to receiving signals or other inputs from the one or more processors 510 and/or the one or more automated driving modules 560. Any suitable actuator can be used. For example, the one or more actuators 550 can include motors, pneumatic actuators, hydraulic pistons, relays, solenoids, and/or piezoelectric actuators. For example, functions and/or operations of the actuator 234 (illustrated in FIG. 2) can be realized by the one or more actuators 550.

The one or more processors 510 and/or the one or more automated driving modules 560 can be operatively connected to communicate with the various vehicle systems 540 and/or individual components thereof. For example, the one or more processors 510 and/or the one or more automated driving modules 560 can be in communication to send and/or receive information from the various vehicle systems 540 to control the movement, speed, maneuvering, heading, direction, etc. of the vehicle 500. The one or more processors 510 and/or the one or more automated driving modules 560 may control some or all of these vehicle systems 540 and, thus, may be partially or fully automated.

The one or more processors 510 and/or the one or more automated driving modules 560 may be operable to control the navigation and/or maneuvering of the vehicle 500 by controlling one or more of the vehicle systems 540 and/or components thereof. For example, when operating in an automated mode, the one or more processors 510 and/or the one or more automated driving modules 560 can control the direction and/or speed of the vehicle 500. The one or more processors 510 and/or the one or more automated driving modules 560 can cause the vehicle 500 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The communications system 570 can include one or more receivers 571 and/or one or more transmitters 572. The communications system 570 can receive and transmit one or more messages through one or more wireless communications channels. For example, functions and/or operations of one or more of the communications device 206 (illustrated in FIG. 2) or the communications device 310 (illustrated in FIG. 3) can be realized by the communications system 570. For example, the one or more wireless communications channels can be in accordance with the Institute of Electrical and Electronics Engineers (IEEE) 802.11p standard to add wireless access in vehicular environments (WAVE) (the basis for Dedicated Short-Range Communications (DSRC)), the 3rd Generation Partnership Project (3GPP) Long-Term Evolution (LTE) Vehicle-to-Everything (V2X) (LTE-V2X) standard (including the LTE Uu interface between a mobile communication device and an Evolved Node B of the Universal Mobile Telecommunications System), the 3GPP fifth generation (5G) New Radio (NR) Vehicle-to-Everything (V2X) standard (including the 5G NR Uu interface), or the like. For example, the communications system 570 can include "connected vehicle" technology. "Connected vehicle" technology can include, for example, devices to exchange communications between a vehicle and other devices in a packet-switched network. Such other devices can include, for example, another vehicle (e.g., "Vehicle to Vehicle" (V2V) technology), roadside infrastructure (e.g., "Vehicle to Infrastructure" (V2I) technology), a cloud platform (e.g., "Vehicle to Cloud" (V2C) technology), a pedestrian (e.g., "Vehicle to Pedestrian" (V2P) technology), or a network (e.g., "Vehicle to Network" (V2N) technology. "Vehicle to Everything" (V2X) technology can integrate aspects of these individual communications technologies.

Moreover, the one or more processors 510, the one or more data stores 515, and the communications system 570 can be configured to one or more of form a micro cloud, participate as a member of a micro cloud, or perform a function of a leader of a mobile micro cloud. A micro cloud can be characterized by a distribution, among members of the micro cloud, of one or more of one or more computing resources or one or more data storage resources in order to collaborate on executing operations. The members can include at least connected vehicles.

The vehicle 500 can include one or more modules, at least some of which are described herein. The modules can be implemented as computer-readable program code that, when executed by the one or more processors 510, implement one or more of the various processes described herein. One or more of the modules can be a component of the one or more processors 510. Additionally or alternatively, one or more of the modules can be executed on and/or distributed among other processing systems to which the one or more processors 510 can be operatively connected. The modules can include instructions (e.g., program logic) executable by the one or more processors 510. Additionally or alternatively, the one or more data store 515 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 500 can include one or more automated driving modules 560. The one or more automated driving modules 560 can be configured to receive data from the sensor system 520 and/or any other type of system capable of capturing information relating to the vehicle 500 and/or the external environment of the vehicle 500. In one or more arrangements, the one or more automated driving modules 560 can use such data to generate one or more driving scene models. The one or more automated driving modules 560 can determine position and velocity of the vehicle 500. The one or more automated driving modules 560 can determine the location of obstacles, obstacles, or other environmental features including traffic signs, trees, shrubs, neighboring vehicles, pedestrians, etc.

The one or more automated driving modules 560 can be configured to receive and/or determine location information for obstacles within the external environment of the vehicle 500 for use by the one or more processors 510 and/or one or more of the modules described herein to estimate position and orientation of the vehicle 500, vehicle position in global coordinates based on signals from a plurality of satellites, or any other data and/or signals that could be used to determine the current state of the vehicle 500 or determine the position of the vehicle 500 with respect to its environment for use in either creating a map or determining the position of the vehicle 500 in respect to map data.

The one or more automated driving modules 560 can be configured to determine one or more travel paths, current automated driving maneuvers for the vehicle 500, future automated driving maneuvers and/or modifications to current automated driving maneuvers based on data acquired by the sensor system 520, driving scene models, and/or data from any other suitable source such as determinations from the sensor data 519. As used herein, "driving maneuver" can refer to one or more actions that affect the movement of a vehicle. Examples of driving maneuvers include: accelerating, decelerating, braking, turning, moving in a lateral direction of the vehicle 500, changing travel lanes, merging into a travel lane, and/or reversing, just to name a few possibilities. The one or more automated driving modules 560 can be configured to implement determined driving maneuvers. The one or more automated driving modules 560 can cause, directly or indirectly, such automated driving maneuvers to be implemented. As used herein, "cause" or "causing" means to make, command, instruct, and/or enable an event or action to occur or at least be in a state where such event or action may occur, either in a direct or indirect manner. The one or more automated driving modules 560 can be configured to execute various vehicle functions and/or to transmit data to, receive data from, interact with, and/or control the vehicle 500 or one or more systems thereof (e.g., one or more of vehicle systems 540). For example, functions and/or operations of an automotive navigation system can be realized by the one or more automated driving modules 560.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-3, 4A, 4B, and 5, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having." as used herein, are defined as comprising (i.e., open language). The phrase "at least one of ... or ... " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof.

Accordingly, reference should be made to the following claims, rather than to the foregoing specification, as indicating the scope hereof.

What is claimed is:

1. A system, comprising:
a processor; and
a memory storing:
   a communications module including instructions that, when executed by the processor, cause the processor to:
      obtain information about a specific side of a road on which a vehicle is to be operated; and
      obtain information about a degree of familiarity of an individual in operating the vehicle on the specific side; and
   an actuation module including instructions that, when executed by the processor, cause the processor to cause, in response to the degree of familiarity being less than a threshold, a possible change to a normal operation of a steering operator interface of the vehicle, in response to a receipt of an input from the individual, to guide the individual to cause the vehicle to make a turn, in a direction, correctly, wherein the possible change comprises at least one of:
      a change of a steering torque feedback, to be perceived by the individual, in response to the direction of the turn being:
         opposite of the specific side, the change being an increase, or
         identical to the specific side, the change being a decrease, or
      a change to a steering ratio, the steering ratio being a ratio between a measure of a change of a position of the steering operator interface and a measure of a degree of a rotation of a wheel of the vehicle.

2. The system of claim 1, wherein the instructions to obtain the information about the specific side of the road on which the vehicle is to be operated include instructions to receive, via a communications device, a signal that includes the information about the specific side of the road on which the vehicle is to be operated.

3. The system of claim 1, wherein the instructions to obtain the information about the specific side of the road on which the vehicle is to be operated include instructions to:
   determine, via a sensor, a current location of the vehicle; and
   determine, based on the current location of the vehicle, the specific side of the road on which the vehicle is to be operated.

4. The system of claim 1, wherein the instructions to obtain the information about the specific side of the road on which the vehicle is to be operated include instructions to:
   determine, via a sensor, a lane marking that indicates the specific side of the road on which the vehicle is to be operated; and
   determine, based on the lane marking, the specific side of the road on which the vehicle is to be operated.

5. The system of claim 1, wherein the instructions to obtain the information about the degree of familiarity of the individual in operating the vehicle on the specific side include instructions to receive, via a communications device, a signal that includes the information about the degree of familiarity of the individual in operating the vehicle on the specific side.

6. The system of claim 1, wherein the instructions to obtain the information about the degree of familiarity of the individual in operating the vehicle on the specific side include instructions to receive, via an interface, a signal that includes the information about the degree of familiarity of the individual in operating the vehicle on the specific side.

7. The system of claim 1, wherein the instructions to obtain the information about the degree of familiarity of the individual in operating the vehicle on the specific side include instructions to:

obtain, via a sensor, information indicative of a cognitive state of the individual, the information indicative of the cognitive state of the individual produced at a time in which the vehicle was being operated on the specific side of the road; and determine, based on the information indicative of the cognitive state of the individual, the degree of familiarity of the individual in operating the vehicle on the specific side.

8. The system of claim 1, wherein the instructions to cause the possible change to the normal operation of the steering operator interface include instructions to cause a change to the steering torque feedback.

9. The system of claim 8, wherein:

the turn is to be initiated at an intersection, the specific side of the road is either left or right, the direction of the turn is either left or right, the direction of the turn being opposite of the specific side, and the change to the steering torque feedback is the increase of the steering torque feedback.

10. The system of claim 8, wherein:

the turn is to be initiated at an intersection, the specific side of the road is either left or right, the direction of the turn is either left or right, the direction of the turn being identical to the specific side, and the change to the steering torque feedback is the decrease of the steering torque feedback.

11. The system of claim 1, wherein:

the turn is to be initiated at an intersection, the specific side of the road is either left or right, a direction of the turn is either left or right, the direction of the turn being opposite of the specific side, and the change to the steering ratio is a decrease of the steering ratio.

12. The system of claim 1, wherein:

the turn is to be initiated at an intersection, the specific side of the road is either left or right, a direction of the turn is either left or right, the direction of the turn being identical to the specific side, and the change to the steering ratio is an increase of the steering ratio.

13. The system of claim 1, wherein the actuation module further includes instructions to define, in response to a receipt of information indicative that a probability that the vehicle is about to make the turn is greater than a probability threshold, a first time as a time at which to commence the possible change to the normal operation of the steering operator interface.

14. The system of claim 13, wherein the actuation module further includes instructions to define, in response to having defined the first time, a second time as a time at which to cease the possible change to the normal operation of the steering operator interface.

15. The system of claim 14, wherein the actuation module further includes instructions to define, in response to having defined the second time, a first duration of time during which to cause the possible change to the normal operation of the steering operator interface.

16. The system of claim 15, wherein:

the turn is in a general direction for the first duration of time, the turn in the general direction includes, for a second duration of time, at least one specific turn in a direction opposite of the general direction, the second duration of time being less than the first duration of time, and the instructions to cause the possible change to the normal operation of the steering operator interface include instructions to cause the possible change to the normal operation of the steering operator interface throughout the first duration of time.

17. The system of claim 1, wherein the memory further stores an override module including instructions that, when executed by the processor, cause the processor to:

obtain information about an existence of a condition in which a probability that the possible change to the normal operation will be detrimental to an operation of the vehicle is greater than a probability threshold; and cause, in response to a determination of the existence of the condition, the possible change to the normal operation of the steering operator interface to be a lack of change to the normal operation of the steering operator interface.

18. The system of claim 1, wherein the degree of familiarity of the individual in operating the vehicle on the specific side of the road on which the vehicle is to be operated is a function of an amount of time the individual has spent operating the vehicle on the specific side of the road on which the vehicle is to be operated.

19. A method, comprising:

obtaining, by a processor, information about a specific side of a road on which a vehicle is to be operated;

obtaining, by the processor, information about a degree of familiarity of an individual in operating the vehicle on the specific side; and causing, by the processor and in response to the degree of familiarity being less than a threshold, a possible change to a normal operation of a steering operator interface of the vehicle, in response to a receipt of an input from the individual, to guide the individual to cause the vehicle to make a turn, in a direction, correctly, wherein the possible change comprises at least one of:

a change of a steering torque feedback, to be perceived by the individual, in response to the direction of the turn being:

opposite of the specific side, the change being an increase, or identical to the specific side, the change being a decrease, or a change to a steering ratio, the steering ratio being a ratio between a measure of a change of a position of the steering operator interface and a measure of a degree of a rotation of a wheel of the vehicle.

20. The method of claim 19, further comprising obtaining, by the processor, information indicative of an acknowledgement, by the individual, that the method includes the causing the possible change to the normal operation of the steering operator interface.

21. A non-transitory computer-readable medium for guiding an individual to cause a vehicle to make a turn correctly, the non-transitory computer-readable medium including instructions that, when executed by one or more processors, cause the one or more processors to:

obtain information about a specific side of a road on which the vehicle is to be operated;

obtain information about a degree of familiarity of the individual in operating the vehicle on the specific side; and cause, in response to the degree of familiarity being less than a threshold, a possible change to a normal operation of a steering operator interface of the vehicle, in response to a receipt of an input from the individual, to guide the individual to cause the vehicle to make the turn, in a direction, correctly, wherein the possible change comprises at least one of:

a change of a steering torque feedback, to be perceived by the individual, in response to the direction of the turn being:

opposite of the specific side, the change being an increase, or identical to the specific side, the change being a decrease, or a change to a steering ratio, the steering ratio being a ratio between a measure of a change of a position of the steering operator interface and a measure of a degree of a rotation of a wheel of the vehicle.

* * * * *